(12) United States Patent
Kang et al.

(10) Patent No.: US 9,871,579 B2
(45) Date of Patent: Jan. 16, 2018

(54) APPARATUS AND METHOD FOR UPLINK POWER CONTROL OF SATELLITE AND TERRESTRIAL INTEGRATED COMMUNICATION SYSTEM

(71) Applicant: Electronics and Telecommunications Research Institute, Daejeon (KR)

(72) Inventors: Kun Seok Kang, Daejeon (KR); Tae Chul Hong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 50 days.

(21) Appl. No.: 15/045,656

(22) Filed: Feb. 17, 2016

(65) Prior Publication Data

US 2016/0241328 A1    Aug. 18, 2016

(30) Foreign Application Priority Data

Feb. 17, 2015    (KR) ........................ 10-2015-0024359

(51) Int. Cl.
  *H04B 7/185*    (2006.01)
  *H04W 52/14*    (2009.01)
(52) U.S. Cl.
  CPC ...... *H04B 7/18539* (2013.01); *H04W 52/146* (2013.01)
(58) Field of Classification Search
  None
  See application file for complete search history.

(56) References Cited

U.S. PATENT DOCUMENTS

| | | |
|---|---|---|
| 2005/0037749 A1 | 2/2005 | Karabinis et al. |
| 2006/0194576 A1 | 8/2006 | Karabinis et al. |
| 2006/0211371 A1 | 9/2006 | Karabinis et al. |
| 2010/0039983 A1* | 2/2010 | Yee ............... H04B 7/18539 370/316 |
| 2011/0044237 A1* | 2/2011 | Oh ................... H04B 7/2041 370/326 |
| 2011/0149836 A1 | 6/2011 | Hong et al. |
| 2013/0315112 A1* | 11/2013 | Gormley .......... H04W 16/14 370/280 |
| 2014/0087652 A1 | 3/2014 | Etri |

\* cited by examiner

*Primary Examiner* — Moustapha Diaby
(74) *Attorney, Agent, or Firm* — William Park & Associates Ltd.

(57) ABSTRACT

In a satellite and terrestrial integrated communication system in which a satellite communication system and a terrestrial communication system share and use an identical frequency band, an interference to a mobile earth station (MES) of the satellite communication system using an identical frequency by an uplink signal transmitted to a base station of the terrestrial communication system by a user equipment (UE) may be mitigated. When a communication of the MES is requested, a satellite communication apparatus to perform resource block (RB) allocation for a satellite communication in the satellite and terrestrial integrated system may include a controller configured to allocate a first RB to the MES, and a communicator configured to transmit a use notification of the first RB to at least one terrestrial base station located in an interference range of an uplink signal of the MES.

20 Claims, 6 Drawing Sheets

APPARATUS AND METHOD FOR UPLINK POWER CONTROL OF SATELLITE AND TERRESTRIAL INTEGRATED COMMUNICATION SYSTEM

CROSS-REFERENCE TO RELATED APPLICATION

This application claims the priority benefit of Korean Patent Application No. 10-2015-0024359, filed on Feb. 17, 2015, at the Korean Intellectual Property Office, the disclosure of which is incorporated herein by reference.

BACKGROUND

1. Field of the Invention

Embodiments relate to an apparatus and method for an uplink power control of a satellite and terrestrial integrated communication system, and more particularly, to a method of controlling a terrestrial uplink power to mitigate an interference with respect to a satellite uplink signal by a terrestrial uplink signal in the satellite and terrestrial integrated communication system in which a satellite communication system and a terrestrial communication system share and use a frequency.

2. Description of the Related Art

In a satellite communication system for a multi-beam environment, different frequency bands may be used between adjacent satellite beams to prevent interference between the satellite beams. In a satellite and terrestrial integrated communication system, a frequency band used in a satellite beam may be reused in a terrestrial communication system. When the frequency band is usable in both of a satellite communication system and the terrestrial communication system, it is possible to reuse the frequency band. For the frequency band reusable in both of the satellite communication system and the terrestrial communication system, a method of utilizing the frequency band may be determined based on a policy of a country.

According to a frequency being shared and used in the satellite and terrestrial integrated communication system, a degree of frequency utilization may increase when the terrestrial communication system utilizes a frequency used in a single satellite beam within a satellite beam area neighboring the satellite beam. Thus, a method in which the terrestrial communication system uses remaining frequency bands except a frequency band used by the satellite communication system in a predetermined satellite beam of the multi-beam satellite may be used. However, an uplink signal received from a mobile earth station (MES) by a satellite may be affected by an interference of uplink signals transmitted by user equipment (UE) located in a satellite beam area neighboring the predetermined satellite beam using the frequency band. Thus, a method of mitigating an interference of a satellite uplink signal in the satellite and terrestrial integrated communication system using and sharing a frequency may be required.

SUMMARY

According to an aspect, there is provided a satellite communication apparatus for performing resource block (RB) allocation for a satellite communication in a satellite and terrestrial integrated communication system, the satellite communication apparatus including a controller configured to allocate a first RB to a mobile earth station (MES) when a communication of the MES is requested, and a communicator configured to transmit a use notification of the first RB to at least one terrestrial base station located in an interference range of an uplink signal of the MES.

The at least one terrestrial base station may be a terrestrial base station located in at least one area of a second satellite beam neighboring an area of a first satellite beam corresponding to the satellite communication apparatus. The at least one terrestrial base station may be a terrestrial base station for which the first RB is allocated to be used.

The use notification of the first RB may include at least one of a use restriction request with respect to the first RB and a power control request of a link to which the first RB is allocated. The power control request may include at least one of information on a satellite beam in which an interference occurs, information on an RB to which a power control is requested, a signal quality difference value, and a power control requirement amount.

The satellite communication apparatus may further include a monitor configured to monitor a signal quality of a satellite uplink signal during the satellite communication, wherein the communicator additionally may transmit the use notification of the first RB to the at least one terrestrial base station when the signal quality is less than a threshold.

The communicator may transmit a use cancel notification of the first RB to the at least one terrestrial base station when the satellite communication terminates.

When a satellite associated with the satellite communication is an on-board processing (OBP) satellite, the satellite communication apparatus may be included in at least a portion of the satellite. When a satellite associated with the satellite communication is a bent-pipe satellite, the satellite communication apparatus may be included in at least a portion of a satellite earth station connected to the satellite.

According to another aspect, there is provided a terrestrial communication apparatus for performing a resource block (RB) allocation for a terrestrial communication in a satellite and terrestrial integrated communication system, the terrestrial communication apparatus including a communicator configured to receive a use notification of a first RB from a satellite communication apparatus, and a controller configured to control an uplink power of the first RB when the use notification of the first RB is received.

The terrestrial communication apparatus may further include a calculator configured to determine a control amount of the uplink power for each terrestrial base station of the first RB.

The control amount of the uplink power for each terrestrial base station may be determined based on at least one of a satellite beam location, a terrestrial base station location, a total interference amount, a signal quality difference value, and a power control requirement amount. The control amount of the uplink power for each terrestrial base station may be determined by a look-up table scheme based on a database including information on a satellite beam location, a terrestrial base station location, a total interference amount, and a power control requirement amount.

The controller may limit an additional allocation of the first RB until a use cancel notification of the first RB is received from the satellite communication apparatus.

According to still another aspect, there is provided a satellite communication method of performing a resource block (RB) allocation for a satellite communication in a satellite and terrestrial integrated communication system, the satellite communication method including allocating a first RB to a mobile earth station (MES) when a communication of the MES is requested, and transmitting a use notification of the first RB to at least one terrestrial base station located in an interference range of an uplink signal of the MES.

The at least one terrestrial base station may be a terrestrial base station located in at least one area of a second satellite beam neighboring an area of a first satellite beam corresponding to a satellite communication apparatus configured to perform the satellite communication method. The at least one terrestrial base station may be a terrestrial base station to which the first RB is allocated to be used.

The use notification of the first RB may include at least one of a use restriction notification request with respect to the first RB and a power control request of a link to which the first RB is allocated. The power control request may include at least one of information on a satellite beam in which an interference occurs, information on an RB to which a power control is requested, a signal quality difference value, and a power control requirement amount.

The satellite communication method may further include monitoring a signal quality of a satellite uplink signal during the satellite communication, and additionally transmitting the use notification of the first RB to the at least one terrestrial base station when the signal quality is less than a threshold.

The satellite communication method may include transmitting a use cancel notification of the first RB to the at least one terrestrial base station when the satellite communication terminates.

According to a further aspect, there is provided a terrestrial communication method of performing a resource block (RB) allocation for a satellite communication in a satellite and terrestrial integrated communication system, the terrestrial communication method including receiving a use notification of a first RB from a satellite communication apparatus and controlling an uplink power of the first RB when the use notification of the first RB is received.

The terrestrial communication method may further include determining a control amount of the uplink power for each terrestrial base station of the first RB.

The control amount of the uplink power for each terrestrial base station may be determined based on at least one of a satellite beam location, a terrestrial base station location, a total interference amount, a signal quality difference value, and a power control requirement amount. The control amount of the uplink power for each terrestrial base station may be determined by a look-up table scheme based on a database including information on a satellite beam location, a terrestrial base station location, a total interference amount, and a power control requirement amount.

The terrestrial communication method may further include limiting, by a controller, an additional allocation of the first RB until a use cancel notification of the first RB is received from the satellite communication apparatus.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
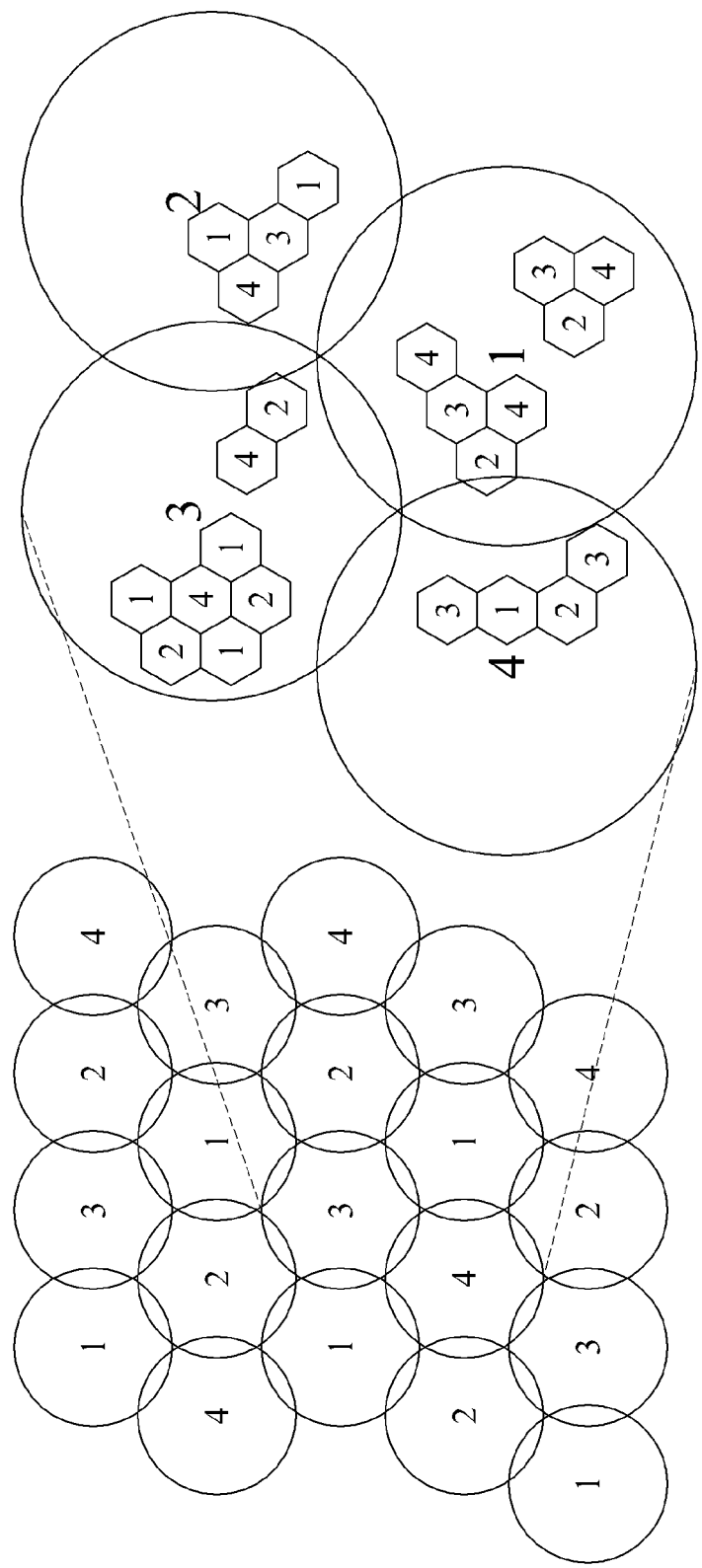
FIG. 1 illustrates an example of a method in which a satellite communication system and a terrestrial communication system shares and uses a frequency according to an embodiment.

In a satellite and terrestrial integrated communication system in which a satellite communication system and a terrestrial communication system share and use an identical frequency band, an interference may occur in an uplink signal transmitted to a satellite by a mobile earth station (MES) in the satellite communication system using an identical frequency due to an uplink signal transmitted to a base station of the terrestrial communication system by a user equipment (UE). The present disclosure may provide a method of controlling an uplink power of the terrestrial communication system to mitigate such interference.

Reference will now be made in detail to embodiments of the present disclosure, examples of which are illustrated in the accompanying drawings, wherein like reference numerals refer to like elements throughout. Embodiments are described below to explain the present disclosure by referring to the figures.

FIG. 1 illustrates an example of a method in which a satellite communication system and a terrestrial communication system share and use a frequency according to an example embodiment. In a case of a frequency band usable in both of a satellite communication system and a terrestrial communication system, the satellite communication system and the terrestrial communication system, for example, a complementary ground component (CGC) of the satellite communication system, may divide and share the frequency band. In an example illustrated in FIG. 1, a satellite and terrestrial integrated communication system may divide a frequency band into four bands to be used. Each of the four bands is indicated by 1 through 4. In FIG. 1, each circle illustrated indicates a satellite beam area of a multi-beam satellite. A number illustrated in each circle indicates a frequency band allocated to each satellite beam. Different frequencies may be used between neighboring satellite beams such that an interference between the satellite beams may not occur. In addition, each hexagon illustrated in FIG. 1 indicates a terrestrial cell of the terrestrial communication system. A number illustrated in each hexagon indicates a frequency band allocated to each terrestrial cell.

As illustrated in FIG. 1, in a terrestrial cell located in a satellite beam area using a first frequency band, a second frequency band, a third frequency band, and a fourth frequency band may be reused. In a terrestrial cell located in a satellite beam area using the second frequency band, the first frequency band, the third frequency band, and the fourth frequency band may be reused. In a terrestrial cell located in satellite beam areas using the third frequency band and the fourth frequency band, frequency bands may be reused based on a method similar to the aforementioned method. In an example illustrated in FIG. 1, although a frequency band is reused by using different frequency bands for each terrestrial cell, the frequency band may be reused in a way in which all terrestrial cells located in an identical satellite beam area use all frequency bands not allocated to a corresponding satellite beam.

When the frequency band is reused using the foregoing method, a user equipment (UE) outside a satellite beam area in which a mobile earth station (MES) is located may use an identical frequency band to that used by the MES. Accordingly, an uplink signal transmitted to a satellite by the MES in the satellite beam area may be affected by an interference of an uplink signal transmitted to a base station of the terrestrial communication system by the UE outside the satellite beam area.

Figure 2:
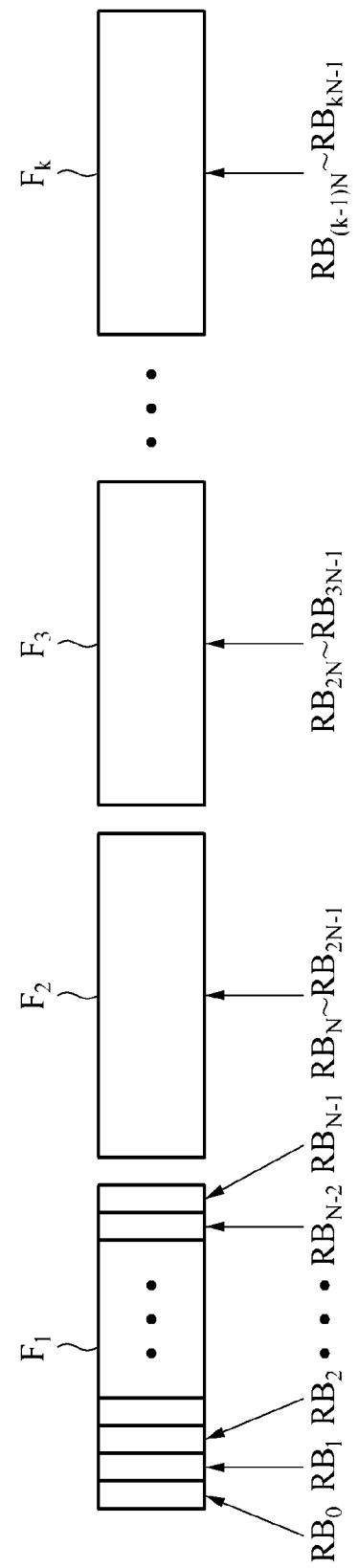
FIG. 2 illustrates an example of a resource block (RB) in a frequency band usable in a satellite and terrestrial integrated communication system according to an embodiment.

FIG. 2 illustrates an example of a resource block (RB) in a frequency band usable in a satellite and terrestrial integrated communication system according to an example embodiment. The satellite and terrestrial integrated communication system may divide a frequency band usable in both of a satellite communication system and a terrestrial communication system into frequency bands $F_1$ through $F_k$ according to a frequency reuse factor of the satellite communication system, and allocate the divided frequency bands $F_1$ through $F_k$ to each satellite beam. Each of the frequency bands $F_1$ through $F_k$ may be divided into N RBs and the divided RBs may be allocated to each mobile earth station (MES).

To share and use the frequency bands $F_1$ through $F_k$ illustrated in FIG. 2 by the satellite communication system and the terrestrial communication system, a base station of the terrestrial communication system may use remaining frequency bands except a frequency band used in a satellite beam corresponding to a satellite beam area in which the base station is located. For example, in a case of a satellite beam using the frequency band $F_1$, a terrestrial base station located in a corresponding satellite beam area may use the frequency bands $F_2$ through $F_k$. In a predetermined satellite beam area, the MES may use N RBs allocated to a satellite beam, and a user equipment (UE) located in the predetermined satellite beam area may use (k−1)N RBs except N RBs allocated to the satellite beam among kN RBs. Here, kN refers to a number of all RBs.

Figure 3:
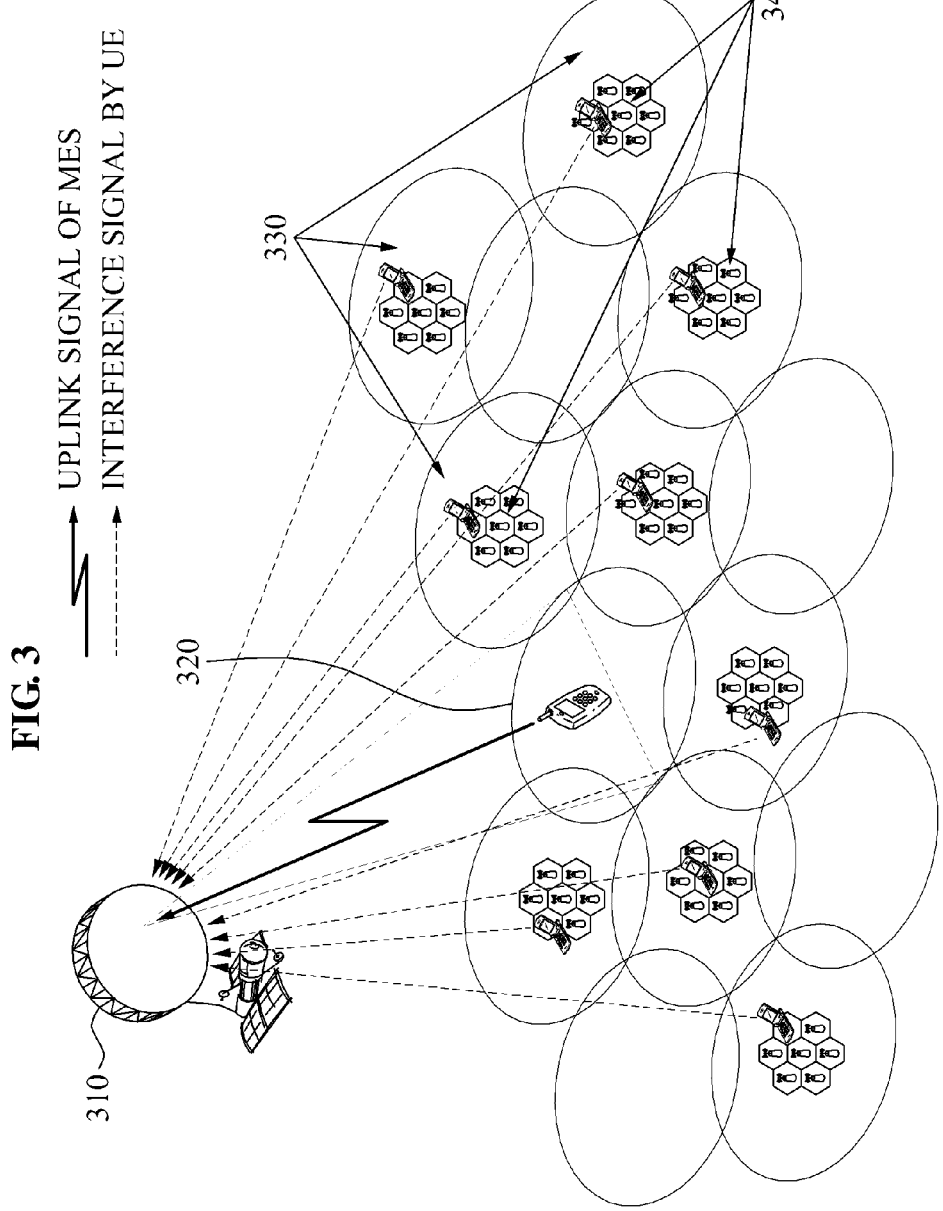
FIG. 3 illustrates an example of an uplink signal of a mobile earth station (MES) affected by an interference of an uplink signal transmitted by a user equipment (UE) according to an embodiment.

FIG. 3 illustrates an example of an uplink signal transmitted to a satellite by a mobile earth station (MES) affected by an interference of an uplink signal transmitted to a base station 340 of a terrestrial communication system by a user equipment (UE) present in an area 330 outside a corresponding satellite beam area 320 according to an example embodiment. As illustrated in FIG. 3, an uplink signal transmitted to a satellite 310 by the MES located in the satellite beam area 320 may be affected by an interference of an uplink signal transmitted to the base station 340 of a terrestrial communication system by the UE outside the satellite beam area 320. An intensity of the uplink signal transmitted by the UE may be relatively low compared to an intensity of the uplink signal transmitted by the MES. Since the UE is outside the satellite beam area 320, a receiving antenna gain of the satellite 310 may be decreased when the UE is located far from a center of a satellite beam. Nevertheless, when an identical frequency band used by a satellite beam is also used in a great number of terrestrial cells, signals of the UE may be concentrated thereby interfering with a satellite uplink signal of the satellite beam area 320. Concisely, when a great number of UEs transmit a resource block (RB) in an identical frequency band using an uplink signal, the uplink signal of the MES may be affected by an interference such that a formation of a satellite communication link may be interrupted.

To mitigate such interference, a satellite communication apparatus may transmit a use notification of an RB allocated to the MES to a terrestrial communication apparatus. The terrestrial communication apparatus that receives the use notification of the RB may limit a use of the RB or decrease a transmission power of the UE using the RB.

Figure 4:
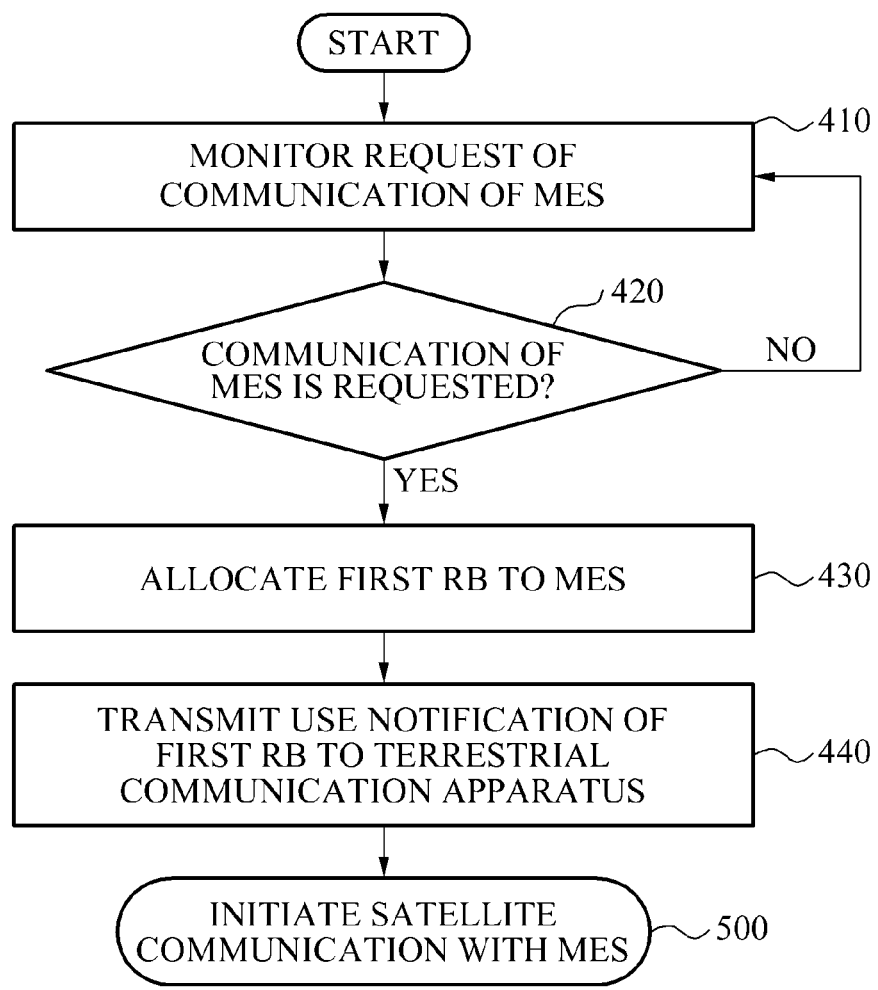
FIG. 4 is a flowchart illustrating an example of a satellite communication apparatus to transmit a use notification of a resource block (RB) when a satellite communication of a mobile earth station (MES) is requested according to an embodiment.

FIG. 4 is a flowchart illustrating an example of a satellite communication apparatus to transmit a use notification of a resource block (RB) when a satellite communication is requested by a mobile earth station (MES) according to an example embodiment. The satellite communication apparatus may be an apparatus for performing RB allocation for the satellite communication in a satellite and terrestrial integrated communication system. When an on-board processing (OBP) satellite is used in a satellite communication system, the satellite communication apparatus may be included in a portion of a satellite. When a bent-pipe satellite is used in the satellite communication system, the satellite communication apparatus may be included in a portion of a satellite earth station located on a ground. The satellite communication apparatus may include a controller to allocate the RB to the MES and a communicator to transmit the use notification of the RB to a terrestrial base station.

In operation 410, the satellite communication apparatus monitors a request of a communication of the MES.

In operation 420, the satellite communication apparatus determines whether a communication is requested by the MES. When a communication is requested by the MES, the satellite communication apparatus performs operation 430 for the RB allocation. When a communication is not requested by the MES, the satellite communication apparatus performs operation 410 and continues to monitor for a communication request by the MES.

In operation 430, the controller of the satellite communication apparatus allocates the RB to the MES which requests a satellite communication. The RB may be allocated based on a method of sharing a frequency band as described with reference to FIG. 1. For example, the controller of the satellite communication apparatus may allocate a first RB to the MES having requested the satellite communication.

In operation 440, the communicator of the satellite communication apparatus transmits a use notification of the allocated RB to a terrestrial communication apparatus. The use notification of the allocated RB may include a use restriction request with respect to the corresponding RB and a power control request of a link to which the corresponding RB is allocated. For example, the communicator of the satellite communication apparatus may transmit, to the terrestrial communication apparatus, a use notification of the first RB including the power control request with respect to the first RB. Thus, the satellite communication apparatus may mitigate an interference by an uplink signal of the UE and secure a formation of a satellite link by allowing, by the use notification of the first RB, the terrestrial communication apparatus to limit a use of the first RB or control a power of the link to which the first RB is allocated.

In operation 500, the satellite communication with the MES is initiated using the RB allocated to the MES in operation 430. In operation 440, the satellite communication may be initiated in an environment in which the interference by the uplink signal of the UE by allowing the terrestrial communication apparatus to limit the use of the first RB or control the power of the link to which the first RB is allocated by the use notification of the RB transmitted in operation 440.

Figure 5:
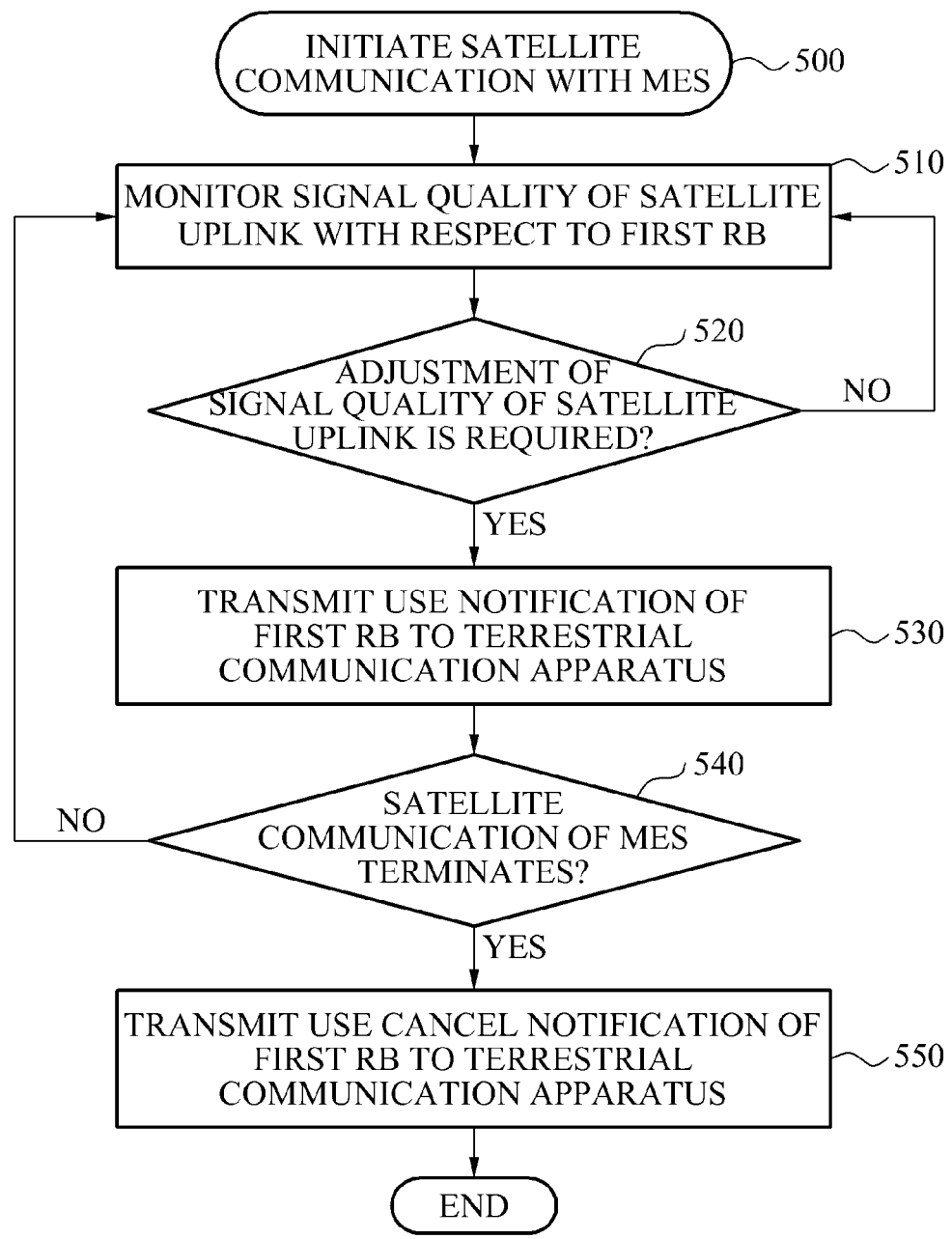
FIG. 5 is a flowchart illustrating an example of a satellite communication apparatus to transmit a use notification of a resource block (RB) during a satellite communication of a mobile earth station (MES) according to an embodiment.

FIG. 5 is a flowchart illustrating an example of a satellite communication apparatus to transmit a use notification of a resource block (RB) during a satellite communication of a mobile earth station (MES) according to an example embodiment. After the satellite communication is initiated, a signal quality may be changed due to factors such as a location change of the MES or a channel change between the MES and a satellite. The satellite communication apparatus may be additionally operated to mitigate an interference in response to the change of the signal quality to protect a satellite link during the satellite communication of the MES. The satellite communication apparatus may include a controller to allocate the RB to the MES, a communicator to transmit a use notification of the RB to a terrestrial base station, and a monitor to monitor the signal quality of a satellite uplink signal.

In operation 510, the monitor of the satellite communication apparatus monitors the signal quality of the satellite uplink signal with respect to the RB used by an MES during the satellite communication. For example, the satellite communication apparatus may measure a signal to interference plus noise ratio (SINR) to monitor the signal quality of the satellite uplink signal.

In operation 520, the satellite communication apparatus determines that adjustment of the signal quality of the satellite uplink signal is required. For example, the satellite communication apparatus may determines that the adjustment of the signal quality is required based on whether an SINR of a measured satellite uplink signal is less than a predetermined threshold. In more detail, the satellite communication apparatus may determine that the adjustment of the signal quality is required based on Equation 1 using a signal quality difference value $\Delta$SINR of a target signal quality SINR$_{target}$ and a signal quality SINR$_{est}$ measured from a reception signal.

$$\Delta\text{SINR}=\text{SINR}_{target}-\text{SINR}_{est} \quad \text{[Equation 1]}$$

For example, when the signal difference value $\Delta$SINR has a positive value, the satellite communication apparatus may determine that the adjustment of the signal quality of the satellite uplink signal is required. In this example, the satellite communication apparatus performs operation 530. Conversely, when the signal difference value $\Delta$SINR has zero or a negative value, the satellite communication apparatus may determine that the adjustment of the signal quality of the satellite uplink signal is not required. In this example, the satellite communication apparatus performs operation 510 and continues to monitor the signal quality of the satellite uplink signal. In addition, a notification of additional power being available with respect to a corresponding RB may be transmitted to a terrestrial communication apparatus.

In operation 530, the communicator of the satellite communication apparatus transmits, to the terrestrial communication apparatus, the use notification of the RB used by the MES during the satellite communication. The use notification of the RB in use may include at least one of a use restriction request with respect to the corresponding RB and a power control request with respect to a link to which the corresponding RB is allocated. For example, the communicator of the satellite communication apparatus may transmit, to the terrestrial communication apparatus, the use notification of a first RB including the power control request with respect to the first RB. The power control request may include information on a satellite beam in which an interference occurs, information on an RB for which a power control is requested, a signal quality difference value, and a power control requirement amount. The information on the satellite beam may indicate which satellite beam requests a power control and the information on the satellite beam may be required for determining a location of the satellite beam and an interference influence range of the satellite beam.

In operation 540, the satellite communication apparatus determines whether the satellite communication of the MES terminates. When the satellite communication of the MES does not terminate, the satellite communication apparatus performs operation 510 and continues to monitor the signal quality of the satellite uplink signal. When the satellite communication of the MES terminates, the satellite communication apparatus performs operation 550.

In operation 550, the communicator of the satellite communication apparatus transmits, to the terrestrial communication apparatus, a use cancel notification of the RB which terminates use of the RB in the satellite communication. The terrestrial communication apparatus may stop use restriction with respect to an RB or stop the power control of the link to which the RB is allocated by transmitting the use cancel notification of the RB to the terrestrial communication apparatus.

Figure 6:
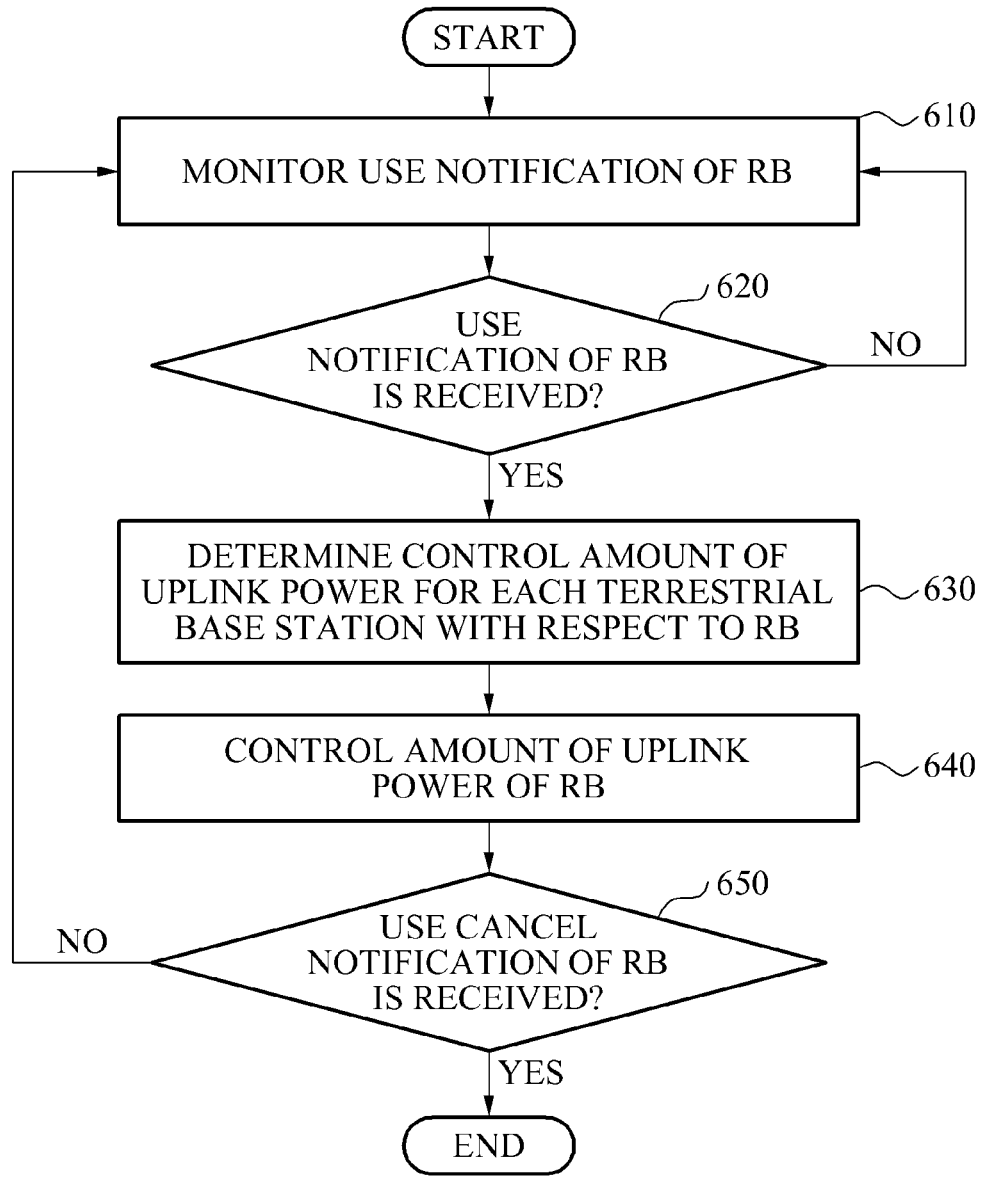
FIG. 6 is a flowchart illustrating an example of a terrestrial communication apparatus for controlling an uplink power according to an embodiment.

FIG. 6 is a flowchart illustrating an example of a terrestrial communication apparatus for controlling an uplink power according to an example embodiment. The terrestrial communication apparatus may be an apparatus for performing resource block (RB) allocation for a terrestrial communication in a satellite and terrestrial integrated communication system. According to a configuration of the satellite and terrestrial integrated communication system, the terrestrial communication apparatus may be included in a portion of a base station of a terrestrial communication system or a portion of a complementary ground component (CGC) of a satellite communication system. The terrestrial communication apparatus may include a communicator to receive a notification of an RB from a satellite communication apparatus, a calculator to determine a control amount of an uplink power for each terrestrial base station of the RB, and a controller to control the uplink power with respect to the RB according to the determined control amount of the uplink power for each terrestrial base station.

In operation 610, the communicator of the terrestrial communication apparatus monitors for a use notification of the RB from the satellite communication apparatus. The use notification of the RB may include a use restriction request with respect to the corresponding RB and a power control request with respect to a link to which the corresponding RB is allocated. For example, a receiver of the terrestrial communication apparatus may receive, from the satellite communication apparatus, a use notification of a first RB including the power control request with respect to the first RB. The power control request may include information on a satellite beam in which an interference occurs, information on an RB for which a power control is requested, a signal quality difference value, and a power control requirement amount.

In operation 620, the terrestrial communication apparatus determines whether the use notification of the RB is received from the satellite communication apparatus. When the use notification of the RB is received from the satellite communication apparatus, the terrestrial communication apparatus performs operation 630. When the use notification of the RB is not received from the satellite communication apparatus, the terrestrial communication apparatus performs operation

610 and continues to monitor for the use notification of the RB from the satellite communication apparatus.

In operation 630, the calculator of the terrestrial communication apparatus determines a control amount of an uplink power for each terrestrial base station with respect to the RB notified to be in use from the satellite communication apparatus. The control amount of the uplink power for each terrestrial base station may be determined based on a total interference amount with respect to the RB, a power control requirement amount, and a signal quality difference value received from the satellite communication apparatus. In an example, the control amount of the uplink power for each terrestrial base station may be determined by a look-up table scheme based on a database including information on a satellite beam location, a terrestrial base station location, the total interference amount, and the power control requirement amount.

Equation 2 expresses a total interference amount $I_{total}$ received by a satellite uplink signal. The satellite uplink signal may receive the total interference amount by an uplink signal transmitted by a user equipment (UE).

$$I_{total} = \sum_{BS} P_{RB} \cdot G_{UE\_ant} \cdot L_p \cdot G_{sat\_ant} \quad \text{[Equation 2]}$$

In Equation 2, $P_{RB}$ denotes a power used in a corresponding RB in the UE, $G_{UE\_ant}$ denotes an antenna gain of the UE, $L_P$ denotes a path loss from the UE to a satellite, and $G_{sat\_ant}$ denotes an antenna gain of the satellite. When the UE forms an uplink signal using a relatively high power, the interference amount with respect to the satellite uplink signal may be relatively great. When the UE is relatively close to a satellite beam receiving an interference, the interference amount with respect to the satellite uplink signal may be great. Even when the UE forms the uplink signal using an identical power, the interference amount may differ according to a location of the terrestrial base station.

In operation 640, the controller of the terrestrial communication apparatus controls the uplink power of the corresponding RB according to the determined control amount of the uplink power for each terrestrial base station. The total interference amount by the uplink signal of the UE with respect to the corresponding RB may be decreased by controlling a terrestrial uplink power with respect to an RB used in the satellite communication.

In operation 650, the terrestrial communication apparatus determines whether a use cancel notification of an RB on which uplink power control is performed is received from the satellite communication apparatus. When the use cancel notification of the RB is received from the satellite communication apparatus, the terrestrial communication apparatus may stop use restriction with respect to the RB or stop the power control of a link to which the RB is allocated. When the use cancel notification of the RB is not received from the satellite communication apparatus, the terrestrial communication apparatus performs operation 610 and continues to monitor for the use notification of the RB from the satellite communication apparatus.

As described above, according to an aspect of the present disclosure, in a satellite and terrestrial integrated communication system in which a satellite communication system and a terrestrial communication system share and use an identical frequency band, an interference received by an MES of the satellite communication system using an identical frequency by an uplink signal transmitted to a base station of the terrestrial communication system by an UE may be mitigated.

The above-described embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

Although a few embodiments of the present disclosure have been shown and described, the present disclosure is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A satellite communication apparatus for performing resource block (RB) allocation for a satellite communication in a satellite and terrestrial integrated communication system, the satellite communication apparatus comprising:
   a controller configured to allocate a first RB to a mobile earth station (MES) when a communication of the MES is requested; and
   a communicator configured to transmit a use notification of the first RB to at least one terrestrial base station located in an interference range of an uplink signal of the MES in response to the communication request of the MES,
   wherein the use notification of the first RB comprises a power control request of a link to which the first RB is allocated, the power control request comprising a power control amount requirement to mitigate an interference of the uplink signal of the MES caused by the at least one terrestrial base station.

2. The satellite communication apparatus of claim 1, wherein the at least one terrestrial base station is located in at least one area of a second satellite beam neighboring an area of a first satellite beam corresponding to the satellite communication apparatus.

3. The satellite communication apparatus of claim 1, wherein the at least one terrestrial base station is a terrestrial base station to which the first RB is allocated to be used.

4. The satellite communication apparatus of claim 1, wherein the use notification of the first RB further comprises a use restriction request with respect to the first RB.

5. The satellite communication apparatus of claim 4, wherein the power control request further comprises at least one of information on a satellite beam in which an interference occurs, information on an RB to which a power control is requested, a signal quality difference value.

6. The satellite communication apparatus of claim 1, further comprising:

a monitor configured to monitor a signal quality of a satellite uplink signal during the satellite communication, wherein the communicator additionally transmits the use notification of the first RB to the at least one terrestrial base station when the signal quality is less than a threshold.

7. The satellite communication apparatus of claim 1, wherein the communicator transmits a use cancel notification of the first RB to the at least one terrestrial base station when the satellite communication terminates.

8. The satellite communication apparatus of claim 1, wherein when a satellite associated with the satellite communication is an on-board processing (OBP) satellite, the satellite communication apparatus is comprised in at least a portion of the satellite.

9. The satellite communication apparatus of claim 1, wherein when a satellite associated with the satellite communication is a bent-pipe satellite, the satellite communication apparatus is comprised in at least a portion of a satellite earth station connected to the satellite.

10. A terrestrial communication apparatus for performing a resource block (RB) allocation for a terrestrial communication in a satellite and terrestrial integrated communication system, the terrestrial communication apparatus comprising:
a communicator configured to receive a use notification of a first RB from a satellite communication apparatus in response to a communication request transmitted by a mobile earth station (MES) to the satellite communication apparatus; and
a controller configured to control an uplink power amount of the first RB when the use notification of the first RB is received to mitigate an interference of an uplink signal of the MES caused by a terrestrial base station located in an interference range of the uplink signal of the MES.

11. The terrestrial communication apparatus of claim 10, further comprising: a calculator configured to determine a control amount of the uplink power for each terrestrial base station of the first RB.

12. The terrestrial communication apparatus of claim 11, wherein the control amount of the uplink power for each terrestrial base station is determined based on at least one of a satellite beam location, a terrestrial base station location, a total interference amount, a signal quality difference value.

13. The terrestrial communication apparatus of claim 11, wherein the control amount of the uplink power for each terrestrial base station is determined by a look-up table scheme based on a database comprising information on a satellite beam location, a terrestrial base station location, a total interference amount, and a power control requirement amount.

14. The terrestrial communication apparatus of claim 10, wherein the controller limits an additional allocation of the first RB until a use cancel notification of the first RB is received from the satellite communication apparatus.

15. A satellite communication method of performing a resource block (RB) allocation for a satellite communication in a satellite and terrestrial integrated communication system, the satellite communication method comprising:
allocating a first RB to a mobile earth station (MES) when a communication of the MES is requested; and
transmitting a use notification of the first RB to at least one terrestrial base station located in an interference range of an uplink signal of the MES in response to the communication request of the MES,
wherein the use notification of the first RB comprises a power control request of a link to which the first RB is allocated, the power control request comprising a power control amount requirement to mitigate an interference of the uplink signal of the MES caused by the at least one terrestrial base station.

16. The satellite communication method of claim 15, wherein the at least one terrestrial base station is located in at least one area of a second satellite beam neighboring an area of a first satellite beam corresponding to a satellite communication apparatus configured to perform the satellite communication method.

17. The satellite communication method of claim 15, wherein the at least one terrestrial base station is a terrestrial base station to which the first RB is allocated to be used.

18. The satellite communication method of claim 15, wherein the use notification of the first RB further comprises a use restriction notification request with respect to the first.

19. The satellite communication method of claim 15, further comprising:
monitoring a signal quality of a satellite uplink signal during the satellite communication; and
additionally transmitting the use notification of the first RB to the at least one terrestrial base station when the signal quality is less than a threshold.

20. The satellite communication method of claim 15, further comprising: transmitting a use cancel notification of the first RB to the at least one terrestrial base station when the satellite communication terminates.

* * * * *